United States Patent
Kielwein

[11] Patent Number: 5,895,003
[45] Date of Patent: Apr. 20, 1999

[54] COUPLING DISK FOR A BELT RETRACTOR

[75] Inventor: Thomas Kielwein, Eschach, Germany

[73] Assignee: TRW Occupant Restraint Systems GmbH, Alfdorf, Germany

[21] Appl. No.: 08/961,709

[22] Filed: Oct. 31, 1997

[30] Foreign Application Priority Data

Nov. 7, 1996 [DE] Germany .......... 296 19 380 U

[51] Int. Cl.$^6$ .................. B60R 22/405
[52] U.S. Cl. .................. 242/383.2; 242/384
[58] Field of Search .................. 242/383.2, 383.5, 242/384, 384.5, 384.6, 379.1; 280/806; 297/478

[56] References Cited

U.S. PATENT DOCUMENTS

| | | | |
|---|---|---|---|
| 3,958,773 | 5/1976 | Sugar | 242/384.5 |
| 3,960,339 | 6/1976 | Fisher | 242/384.6 |
| 4,040,576 | 8/1977 | Walker et al. | 242/384.5 |
| 4,597,543 | 7/1986 | Mori et al. | 242/383.5 |
| 4,905,928 | 3/1990 | Katsuno et al. | 242/383.5 |
| 4,907,820 | 3/1990 | Fohl | 280/806 |
| 5,375,787 | 12/1994 | Fujimura et al. | 242/384.5 |
| 5,485,971 | 1/1996 | Nakaya et al. | 242/381.1 |

FOREIGN PATENT DOCUMENTS

| | | |
|---|---|---|
| 0335360 | 10/1989 | European Pat. Off. . |
| 0752350 | 1/1997 | European Pat. Off. . |
| 0786384 | 7/1997 | European Pat. Off. . |
| 3421960 | 12/1985 | Germany . |

*Primary Examiner*—John M. Jillions
*Attorney, Agent, or Firm*—Tarolli, Sundheim, Covell, Tummino & Szabo

[57] ABSTRACT

A coupling disk comprises a control pawl mounted swivably about a swivel axis for swiveling from a resting position into a engagement position in which the coupling disk is coupled to a functional part of the belt retractor. The control pawl has a mount which is configured yielding transversely to the swivel axis. The control disk comprises an abutment on which the control pawl is supported when the mount yields.

5 Claims, 1 Drawing Sheet

COUPLING DISK FOR A BELT RETRACTOR

The invention relates to a coupling disk for a belt retractor.

BACKGROUND OF THE INVENTION

Conventional coupling disks for a belt retractor comprise a control pawl which is swivably mounted for swiveling from a resting position into a engagement position in which the coupling disk is coupled to a functional part of the belt retractor.

A coupling disk of this type is part of a latching mechanism with which the belt reel of the belt retractor, on which the belt webbing is coiled, can be blocked by vehicle-sensitive or belt webbing-sensitive means against rotation in the uncoiling direction. The latching mechanism of such a belt retractor is known, this being the reason why it is only briefly mentioned in the following.

The coupling disk of the latching mechanism is connected non-rotatably to the belt reel. When the latching mechanism is activated in a vehicle-sensitive manner, i.e. by exceeding a predetermined acceleration or deceleration of the vehicle, or in a belt webbing sensitive manner, i.e. by exceeding a predetermined rotational acceleration of the belt reel due to tensile forces acting in the belt webbing, the control pawl is swiveled from its resting position into the engagement position so that the belt reel is coupled non-rotatably to a control lever or a similar functional part which on rotation of the belt reel in the uncoiling direction activates a load-bearing blocking pawl and thus causes blocking of the belt reel. The belt reel is then blocked in the uncoiling direction.

When the control pawl is in its engagement position, it transmits the forces necessary for blocking the belt reel, from the belt reel via the coupling disk to the functional part of the belt retractor. To prevent these forces from having to be regularly handled by the control pawl mount, requiring the mount to be correspondingly dimensioned, a stop is formed on the coupling disk which supports the control pawl in the engagement position such that the mount is relieved of loading to a major extent. If, however, the control pawl engages the functional part of the belt retractor assigned thereto before it is fully swiveled into its engagement position, more particularly in clashing of its tip and a tooth tip of the functional part, the stop on the coupling disk remains useless, and the entirety of the force transmitted by the control pawl comes to effect on the mount. This is why in the case of conventional coupling disks the mount for the control pawl needs to be over-dimensioned as compared to the usual operating loads so that the mount also stands up to the loads which are transmitted when the control pawl is not supported by the assigned raised face on the coupling disk. This results in high friction and high weight.

BRIEF SUMMARY OF THE INVENTION

The invention provides a coupling disk for which the mount merely needs to be dimensioned with respect to the usual operating loads and not with respect to possible peak loads occurring. Accordingly, the mount of the control pawl can be dimensioned lighter, as a result of which less friction and less weight materialize. According to the invention, the coupling disk comprises a control pawl mounted swivably about a swivel axis for swiveling from a resting position into a engagement position in which the coupling disk is coupled to a functional part of the belt retractor. The control pawl has a mount which is configured yielding transversely to the swivel axis. The control disk comprises an abutment on which the control pawl is supported when the mount yields. This abutment is able to support the control pawl in each of its positions even when it is not in its engagement position.

BRIEF DESCRIPTION OF THE DRAWING

The invention will now be explained on the basis of a preferred embodiment as represented in the attached drawing in which the sole FIGURE is a schematic plan view of a coupling disk in accordance with the invention.

DETAILED DESCRIPTION OF THE INVENTION

Figure 1:
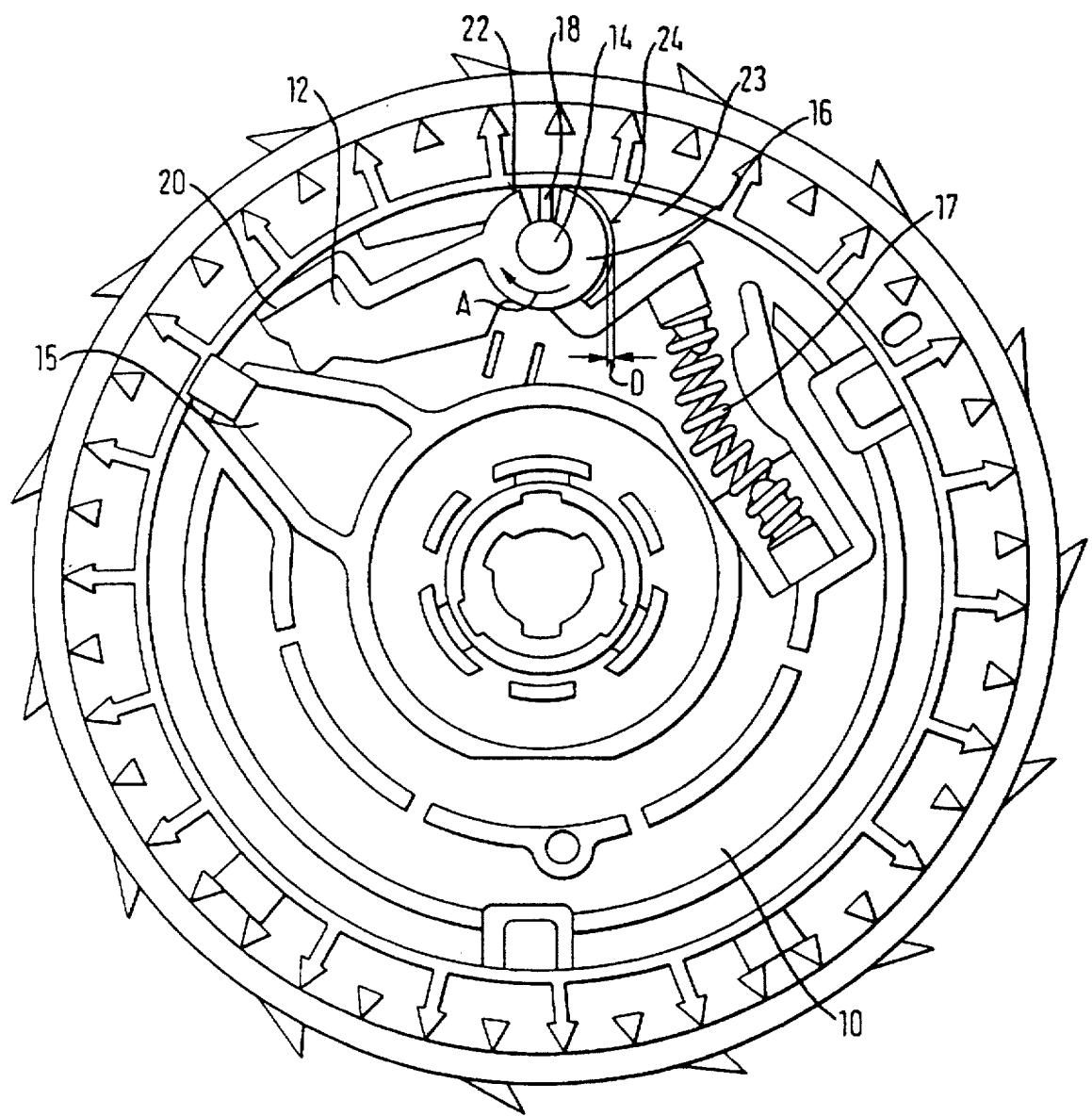

The coupling disk 10 in accordance with the invention shown in FIG. 1 is provided with a control pawl 12 which by means of a mount configured as a mounting pin 14 is mounted swivably between a resting position shown in the FIGURE and an engagement position. From the resting position shown, the control pawl 12 attains the engagement position by a rotation in the direction of the arrow A, prompted by a rotation in the same sense of an actuating part 15. A spring 17 urges the control pawl 12 in its resting position.

The control pawl 12 features a mounting part 16 which clasps the mounting pin 14. This mounting part 16 is open on one side, a spring plate 18 with which the mounting pin 14 is resiliently connected to the coupling disk 10 extending in the region of the opening of the mounting part. The spring plate 18 extends in the same plane as the longitudinal axis of the mounting pin 14.

The control pawl 12 comprises one end configured as an engaging tooth 20, this end being engagable with a functional part of the latching mechanism of the belt retractor. When the control pawl 12 is in its engagement position, a force can thus be transmitted from the coupling disk 10 to the functional part along a direction which is defined by a straight line through the mounting pin 14 and the engaging tooth 20. As viewed from this engaging tooth 20 along this line, the outer contour 22 of the mounting part 16 located behind the mounting pin 14 is concentric to the longitudinal axis of the mounting pin 14. Opposite the outer contour 22, an abutment 23 fixedly connected to the coupling disk 10 is located with an abutment surface area 24 which is likewise concentric to the longitudinal axis of the mounting pin 14. The abutment surface area 24 is located opposite the outer contour 22 of the mounting part 16 with a predetermined spacing D which is greater than the functioning clearance of the mounting part 16 on the mounting pin 14. Accordingly, the control pawl 12 in its normal condition is mounted swivable on the mounting pin 14 without friction arising between the outer contour 22 of the mounting part 16 and the abutment surface area 24. When, however, forces are transmitted from the control pawl 12 to a functional part of the belt retractor, shifting of the mounting pin 14 connected by means of the spring plate 18 elastically to the coupling disk 10 materializes so that the outer contour 22 of the control pawl 12 comes into contact with the abutment surface area 24. The mounting pin 14 is thus loaded only by the forces which are necessary to shift the control pawl 12 into contact with the abutment surface area 24. All forces exceeding the latter are directed straight into the control pawl 12 from the abutment. The mounting pin 14 thus needs to be dimensioned merely with respect to relatively low loads.

I claim:

1. A coupling disk for a belt retractor, comprising a control pawl mounted swivably about a swivel axis for swiveling from a resting position into an engagement position in which said coupling disk is coupled to a functional part of said belt retractor, said control pawl having a mount which is configured yielding transversely to said swivel axis, and said control disk having an abutment on which said control pawl is supported when said mount yields, said mount being formed by an elastically deflectable mounting pin whose longitudinal axis coincides with said swivel axis, said mounting pin being connected to said coupling disk via a spring plate which extends in the same plane as said longitudinal axis of said mounting pin.

2. The coupling disk of claim 1, wherein said control pawl clasps said mounting pin by a mounting part which is open in a region in which said spring plate extends.

3. The coupling disk of claim 2, wherein said abutment, as viewed from a free end of said control pawl engaging said functional part, is located behind said mounting pin and opposite said mounting part with a predetermined spacing.

4. The coupling disk of claim 3, wherein said predetermined spacing is smaller than a clearance between said mounting part and said mounting pin.

5. The coupling disk of claim 4, wherein said mounting part is provided with a supporting surface area and said abutment is provided with an abutment surface area, said supporting surface area and said abutment being concentric to said mounting pin.

* * * * *